(12) United States Patent
Hsu

(10) Patent No.: US 9,954,457 B2
(45) Date of Patent: Apr. 24, 2018

(54) OVERVOLTAGE PROTECTION CIRCUIT

(71) Applicant: ASIAN POWER DEVICES INC., Taoyuan (TW)

(72) Inventor: Chih-Yuan Hsu, Taoyuan (TW)

(73) Assignee: Asian Power Devices Inc., Taoyuan (TW)

( * ) Notice: Subject to any disclaimer, the term of this patent is extended or adjusted under 35 U.S.C. 154(b) by 0 days.

(21) Appl. No.: 15/683,508

(22) Filed: Aug. 22, 2017

(65) Prior Publication Data

US 2018/0069477 A1   Mar. 8, 2018

(30) Foreign Application Priority Data

Sep. 7, 2016 (TW) .............................. 105128843 A

(51) Int. Cl.
| | |
|---|---|
| *H02M 1/32* | (2007.01) |
| *H02M 3/338* | (2006.01) |
| *H02M 3/158* | (2006.01) |
| *H02M 3/156* | (2006.01) |
| *H02M 7/217* | (2006.01) |

(52) U.S. Cl.
CPC ........... *H02M 3/3385* (2013.01); *H02M 1/32* (2013.01); *H02M 3/156* (2013.01); *H02M 3/1588* (2013.01); *H02M 7/217* (2013.01)

(58) Field of Classification Search
CPC .................................................... H02M 1/32
USPC ..................... 363/56.05, 56.08, 56.11, 97, 98
See application file for complete search history.

(56) References Cited

U.S. PATENT DOCUMENTS

| | | | | |
|---|---|---|---|---|
| 5,122,726 A | * | 6/1992 | Elliott ....................... | G05F 1/59 323/272 |
| 2010/0277959 A1 | * | 11/2010 | Lu ........................... | H02M 1/32 363/52 |
| 2011/0194314 A1 | * | 8/2011 | Morota ............. | H02M 3/33507 363/21.15 |
| 2013/0314949 A1 | * | 11/2013 | Chi ......................... | H02M 1/32 363/17 |
| 2014/0016378 A1 | * | 1/2014 | Ke ....................... | H02H 7/1213 363/21.18 |
| 2015/0295496 A1 | * | 10/2015 | Chen ....................... | H02M 1/32 363/21.18 |
| 2016/0172999 A1 | | 6/2016 | Fogg | |

FOREIGN PATENT DOCUMENTS

| | | |
|---|---|---|
| EP | 2779344 A1 | 9/2014 |
| TW | I493844 B | 7/2015 |
| TW | 201545430 A | 12/2015 |
| TW | I514708 B | 12/2015 |

* cited by examiner

*Primary Examiner* — Jeffrey Sterrett
(74) *Attorney, Agent, or Firm* — Li-Jen Shen

(57) ABSTRACT

An overvoltage protection circuit adapted for a switching power supply is provided. The overvoltage protection circuit can use the time difference of the start of the overvoltage protection to distinguish that the overvoltage of the output voltage of the switching power supply is caused by the failure of the internal feedback or by the internal power supply, thereby avoiding a short and harmless external power supply to affect the normal operation of the switching power supply but can immediately stop the switching power supply to achieve protection when the switching power supply has an internal feedback failure.

10 Claims, 3 Drawing Sheets

OVERVOLTAGE PROTECTION CIRCUIT

FIELD OF THE INVENTION

The present invention relates to an overvoltage protection circuit, and more particularly to an overvoltage protection circuit adapted for a switching power supply.

BACKGROUND OF THE INVENTION

The general switching power supply usually uses an overvoltage protection circuit to control the pulse width modulation (PWM) control circuit in the switching power supply to stop outputting the pulse width modulation signal when the output terminal of the switching power supply has an overvoltage, thereby reducing the output voltage at the output terminal to perform overvoltage protection and protect any one of the internal circuit of the switching power supply and the external system coupled to the output terminal from being damaged.

The output terminal may have overvoltage due to two cases, one of which is caused by the failure of the internal circuit of the switching power supply unit (for example, caused by the failure of a feedback circuit) and the other is caused by the external system (for example, caused by the back electromotive force feedback caused by the external system with a decelerating motor). However, the conventional overvoltage protection circuit cannot distinguish the two cases, so that the conventional overvoltage protection circuit will still control the switching power supply to immediately reduce its output voltage for overvoltage protection when the user normally operates the external system and the back electromotive force feedback is caused, which may cause the external system shut down and cannot be used normally and bother the user.

SUMMARY OF THE INVENTION

One objective of the present invention is to provide an overvoltage protection circuit which can distinguish the overvoltage caused by the two cases and correspondingly perform overvoltage protection in two different ways.

The present invention provides an overvoltage protection circuit adapted for a switching power supply. The overvoltage protection circuit can use the time difference of the start of the overvoltage protection to distinguish that the overvoltage of the output voltage of the switching power supply is caused by the failure of the internal feedback or by the internal power supply, thereby avoiding a short and harmless external power supply to affect the normal operation of the switching power supply but can immediately stop the switching power supply to achieve protection when the switching power supply has an internal feedback failure.

BRIEF DESCRIPTION OF THE DRAWING

The present disclosure will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
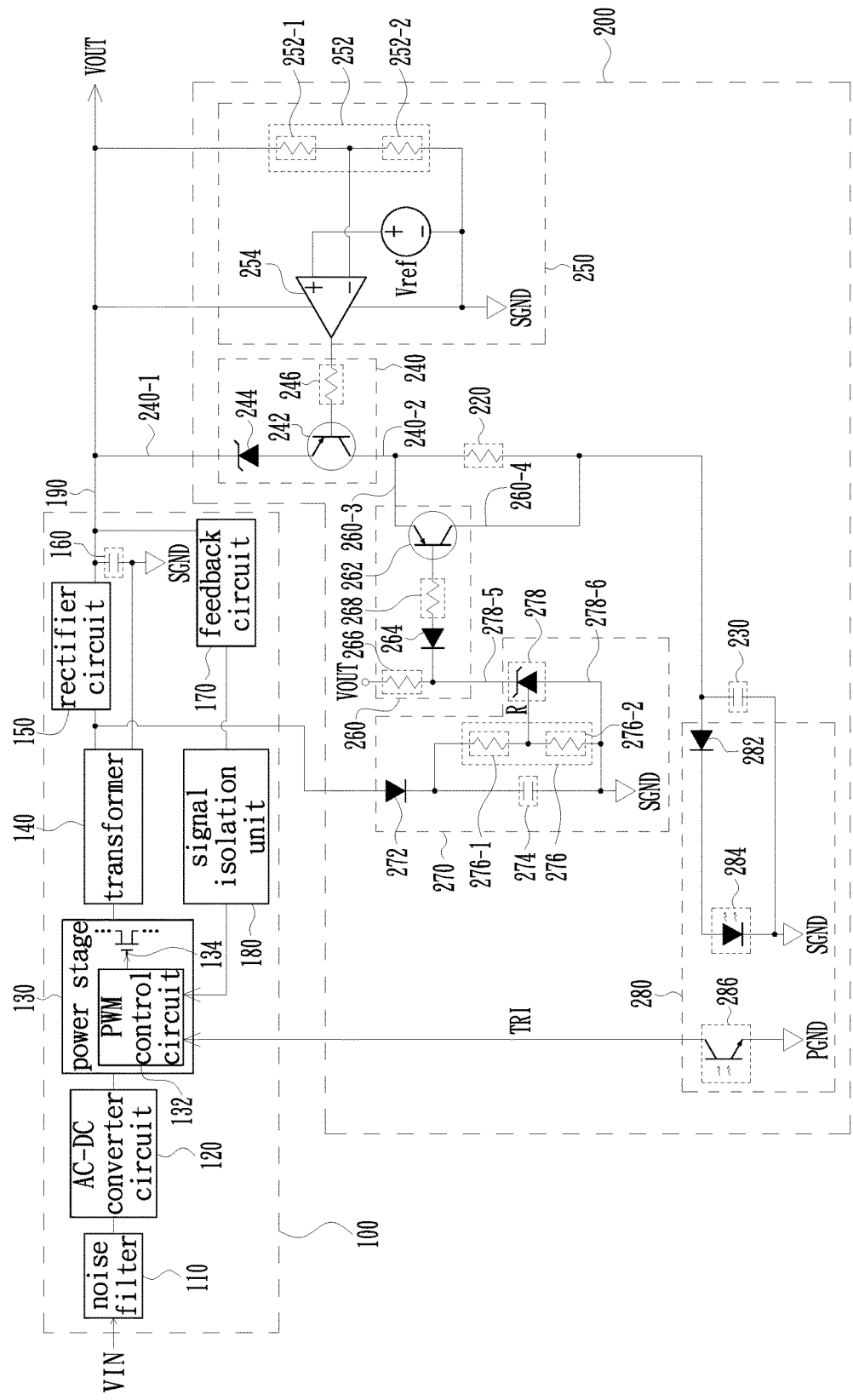
FIG. 1 is a schematic view of the coupling relationship of an overvoltage protection circuit.

In FIG. 1, the switching power supply 100 includes a noise filter 110, an AC-DC converter circuit 120, a power stage 130, a transformer 140, a rectifier circuit 150, an energy storage unit 160, a feedback circuit 170 and a signal isolation unit 180. The primary side winding of the transformer 140 is coupled to an input voltage VIN sequentially via the power stage 130, the AC-DC converter circuit 120 and the noise filter 110. The noise filter 110 may be an electromagnetic interference filter, and the noise filter 110 is optional and may be employed or not according to the requirements.

In addition, the AC-DC converter circuit 120 may be a bridge rectifier. The power stage 130 includes a pulse width modulation (PWM) control circuit 132 and a power transistor 134 for use as a switch. The power transistor 134 may be connected in series with the primary side winding of the transformer 140. By controlling the on/off state of the power transistor 134, it is determined whether or not to allow current to pass through the primary side winding. The PWM control circuit 132 is configured to generate a PWM signal and output the PWM signal to the control terminal of the power transistor 134 to control the switching frequency between the on/off states of the power transistor 134.

After being rectified by the rectifier circuit 150 and filtered by the energy storage unit 160, the output of the secondary side winding of the transformer 140 can be used as the output voltage VOUT of the switching power supply 100 and supplied from the output terminal 190 thereof to an external system (not shown). Further, the rectifier circuit 150 and the energy storage unit 160 are optional and may be employed or not according to the design requirements. In addition, the signal isolation unit 180 may be a photo coupler, which is configured to transmit the feedback signal generated by the feedback circuit 170 to the PWM control circuit 132, so that the PWM control circuit 132 can accordingly adjust the duty cycle of the PWM signal. Therefore, when the output terminal 190 of the switching power supply 100 has an overvoltage, the PWM control circuit 132 can lower the output voltage VOUT according to the feedback signal transmitted from the signal isolation unit 180 for overvoltage protection.

In addition, as shown in FIG. 1, the overvoltage protection circuit 200 includes an impedance 220, an energy storage unit 230, a switching unit 240, an overvoltage detection unit 250, a switching unit 260, a voltage sampling unit 270 and a signal isolation unit 280. One end of the energy storage unit 230 is coupled to one end of the impedance 220 and the other end of the energy storage unit 230 is coupled to the reference potential SGND. The switching unit 240 has a first terminal 240-1 and a second terminal 240-2. The first terminal 240-1 is coupled to the output terminal 190 of the switching power supply 100 and the second terminal 240-2 is coupled to the other end of the impedance 220. The overvoltage detection unit 250 is coupled to the output terminal 190 and the switching unit 240 and is configured to receive the output voltage VOUT at the output terminal 190 and determine whether the output voltage VOUT exceeds the first preset value. The first terminal 240-1 and the second terminal 240-2 of the switching unit 240 are in an on-state when it is determined that the output voltage VOUT exceeds the first preset value.

The switching unit 260 has a third terminal 260-3 and a fourth terminal 260-4. The third terminal 260-3 and the fourth terminal 260-4 are coupled to the two ends of the impedance 220, respectively. The voltage sampling unit 270 is coupled to the switching unit 260 and one end of the secondary side winding of the transformer 140 and is configured to detect whether or not the voltage outputted from the secondary side winding reaches the second preset value. The third terminal 260-3 and the fourth terminal 260-4 of the switching unit 260 are in an on-state when it is determined that the voltage outputted from the secondary side winding reaches the second preset value. The signal isolation unit 280 is coupled to the energy storage unit 230, the impedance 220 and the PWM control circuit 132 and is configured to determine whether or not to generate the overvoltage protection trigger signal TRI according to the voltage stored in the energy storage unit 230, thereby using the overvoltage protection trigger signal TRI to control the PWM control circuit 132 to stop outputting the PWM signal to the power transistor 134.

In the embodiment, the impedance 220 and the energy storage unit 230 may be a resistor and a capacitor, respectively. Next, a detailed embodiment of the remainder of the overvoltage protection circuit 200 will be described first. As shown in FIG. 1, the overvoltage detection unit 250 includes a voltage dividing circuit 252 and a comparator 254. The voltage dividing circuit 252 is coupled between the output terminal 190 of the switching power supply 100 and the reference potential SGND and is configured to generate a voltage dividing signal according to the voltage at the output terminal 190. The positive input terminal of the comparator 254 is configured to receive the reference potential Vref, the negative input terminal of the comparator 254 is configured to receive the voltage dividing signal, and the output terminal of the comparator 254 is coupled to the switching unit 240. The voltage dividing circuit 252 may be the impedances 252-1 and 252-2. One end of the impedance 252-1 is coupled to the output terminal 190, one end of the impedance 252-2 is coupled to the other end of the impedance 252-1, and the other end of the impedance 252-2 is coupled to the reference potential SGND. The impedances 252-1 and 252-2 both may be resistors.

The switching unit 240 includes a PNP type transistor 242, a zener diode 244 and an impedance 246. The PNP type transistor 242 has an emitter, a base and a collector, wherein the base is coupled to the output of the voltage detection unit 250 through the impedance 246 and is configured to determine whether or not to turn on the PNP type transistor 242. The anode of the zener diode 224 is coupled to the emitter of the PNP type transistor 242, and the cathode of the zener diode 244 is coupled to the first terminal 240-1 of the switching unit 240. The zener diode 244 and the impedance 246 are optional and may be employed or not according to the requirements. In addition, the impedance 246 may be a resistor.

The switching unit 260 includes a PNP type transistor 262, a diode 264, an impedance 266 and an impedance 268. The PNP type transistor 262 has an emitter, a base and a collector, wherein the emitter is coupled to the third terminal 260-3 of the switching unit 260 and the collector is coupled to the fourth terminal 260-4 of the switching unit 260. The anode of the diode 264 is coupled to the base of the PNP type transistor 262 through the impedance 268, and the cathode of the diode 264 is coupled to the output terminal 190 through the impedance 266 to receive the output voltage VOUT. The impedance 268 is optional and may be employed or not according to the requirements. In addition, the impedance 266 and the impedance 268 both may be resistors.

The voltage sampling unit 270 includes a diode 272, an energy storage unit 274, a voltage dividing circuit 276 and a voltage-controlled switch 278. The anode of the diode 272 is coupled to one end of the secondary side winding of the transformer 140. The energy storage unit 274 is coupled between the cathode of the diode 272 and the reference potential SGND. The voltage dividing circuit 276 is coupled between the cathode of the diode 272 and the reference potential SGND and is configured to generate a voltage dividing signal according to the voltage stored in the energy storage unit 274. The voltage-controlled switch 278 has a fifth terminal 278-5, a sixth terminal 278-6 and a reference terminal R; wherein the fifth terminal 278-5 is coupled to the switching unit 260, the sixth terminal 278-6 is coupled to the reference potential SGND, and the reference terminal R is configured to receive the voltage dividing signal generated by the voltage dividing circuit 276. The fifth terminal 278-5 and the sixth terminal 278-6 of the voltage-controlled switch 278 are in an on-state when the voltage at the reference terminal R of the voltage-controlled switch 278 reaches the third preset value. The voltage dividing circuit 276 may be the impedances 276-1 and 276-2. One end of the impedance 276-1 is coupled to the cathode of the diode 272, one end of the impedance 276-2 is coupled to the other end of the impedance 276-1, and the other end of the impedance 276-2 is coupled to the reference potential SGND.

The signal isolation unit 280 includes a diode 282, a signal transmitting part 284 and a signal receiving part 286. The anode of the diode 282 is coupled to the energy storage unit 230 and the impedance 220. One end of the signal transmitting part 284 is coupled to the cathode of the diode 282 and the other end thereof is coupled to the reference potential SGND. The signal transmitting part 284 is configured to generate a coupling signal. One end of the signal receiving part 280 is coupled to the PWM control circuit 132 and the other end thereof is coupled to the reference potential PGND. The signal receiving part 286 is configured to receive the coupling signal and accordingly generate the overvoltage protection trigger signal TRI. The signal transmitting part 284 and the signal receiving part 286 may be a transmitting part and a receiving part of a photo coupler, respectively. The diode 282 is optional and may be employed or not according to the requirements.

Next, the detailed operation mode of the voltage protection circuit 200 will be described. The operation mode of the voltage protection circuit 200 will be described first in the case where the internal circuit of the switching power supply 100 fails to cause the output terminal 190 thereof to have an overvoltage. Referring to FIG. 1 again. When the output voltage VOUT at the output terminal 190 exceeds the first preset value so that the voltage of the voltage dividing signal generated by the voltage dividing circuit 252 is greater than the voltage of the reference potential Vref, the output of the comparator 254 has a negative saturation, the PNP type transistor 242 is turned on, and the zener diode 244 is broken down and turned on. Thus, the first terminal 240-1 and the second terminal 240-2 of the switching unit 240 are in an on-state.

Since the overvoltage at the output terminal 190 is caused by the failure of the internal circuit of the switching power supply 100 (for example, caused by the failure of the feedback circuit 170), the feedback circuit 170 will not be able to generate the feedback signal, the PWM control circuit 132 will not be able to adjust the duty cycle of the PWM signal according to the feedback signal transmitted from the signal isolation unit 180, the output voltage VOUT cannot be reduced, and the voltage outputted from the secondary side winding is increasing.

When the voltage outputted from the secondary side winding continuously increases and reaches the second preset value so that the voltage of the voltage dividing signal generated by the voltage dividing circuit 276 reaches the third preset value, the fifth terminal 278-5 and the sixth terminal 278-6 of the voltage-controlled switch 278 are in an on-state. Therefore, the diode 264 and the PNP type transistor 262 are also turned on, and the third terminal 260-3 and the fourth terminal 260-4 of the switching unit 260 are in an on-state. Since the resistance of the path provided by the PNP type transistor 262 is much smaller than the resistance of the impedance 220, the current flowing through the switching unit 240 will select the path provided by the PNP type transistor 262 to charge the energy storage unit 230.

According to the above description, the energy storage unit 230 can be quickly and fully charged to turn on the diode 282, so that the signal transmitting part 284 can quickly generate the coupling signal. The signal receiving part 286 accordingly generates the overvoltage protection trigger signal TRI to the PWM control circuit 132 when receiving the coupling signal, so that the PWM control circuit 132 can immediately lower the output voltage VOUT by controlling the operation of the power transistor 134, thereby performing the overvoltage protection.

Next, the operation mode of the voltage protection circuit 200 will be described in the case where the external system causes the output terminal 190 to have an overvoltage. Referring to FIG. 1 again. When the output voltage VOUT at the output terminal 190 exceeds the first preset value so that the voltage of the voltage dividing signal generated by the voltage dividing circuit 252 is greater than the voltage of the reference potential Vref, the output of the comparator 254 has a negative saturation, the PNP type transistor 242 is turned on, and the zener diode 244 is broken down and turned on. Thus, the first terminal 240-1 and the second terminal 240-2 of the switching unit 240 are in an on-state.

Since the overvoltage at the output terminal 190 is caused by the external system (for example, caused by the back electromotive force feedback caused by the external system with a decelerating motor), the feedback circuit 170 can normally generate the feedback signal, the PWM control circuit 132 can adjust the duty cycle of the PWM signal according to the feedback signal transmitted from the signal isolation unit 180, the output voltage VOUT can be lowered, and the voltage outputted from the secondary side winding is decreasing.

When the voltage outputted from the secondary side winding is continuously decreased and cannot reach the second preset value so that and the voltage of the voltage dividing signal generated by the voltage dividing circuit 276 cannot reach the third preset value, the fifth terminal 278-5 and the sixth terminal 278-6 of the voltage-controlled switch 278 cannot be in an on-state. Therefore, the diode 264 and the PNP type transistor 262 are also in an off-state, and the third terminal 260-3 and the fourth terminal 260-4 of the switching unit 260 cannot be in an on-state. Thus, the current flowing through the switching unit 240 can only pass through the impedance 220 to charge the energy storage unit 230.

Since the resistance of the impedance 220 is much greater than the resistance of the path provided by the PNP type transistor 262, the charging time of the energy storage unit 230 becomes long and the diode 282 is delayed for a period of time before being turned on. Since the signal transmitting part 284 must wait until the diode 282 is turned on to generate the coupling signal, the signal receiving part 286 is also able to receive the coupling signal after delaying the period of time to accordingly generate the overvoltage protection trigger signal TRI to the PWM control circuit 132. It can be seen that the PWM control circuit 132 also reduces the output voltage VOUT by controlling the operation of the power transistor 134 after delaying the period of time, thereby performing overvoltage protection. Namely, in this case, instead of immediately performing overvoltage protection thereby resulting in the external system fails to operate normally, the switching power supply 100 will delay the period of time to perform overvoltage protection. For those of ordinary skill in the art, it is understood that the delay time may be adjusted by changing the resistance of the impedance 220 or by changing the capacitance of the energy storage unit 230.

Figure 2:
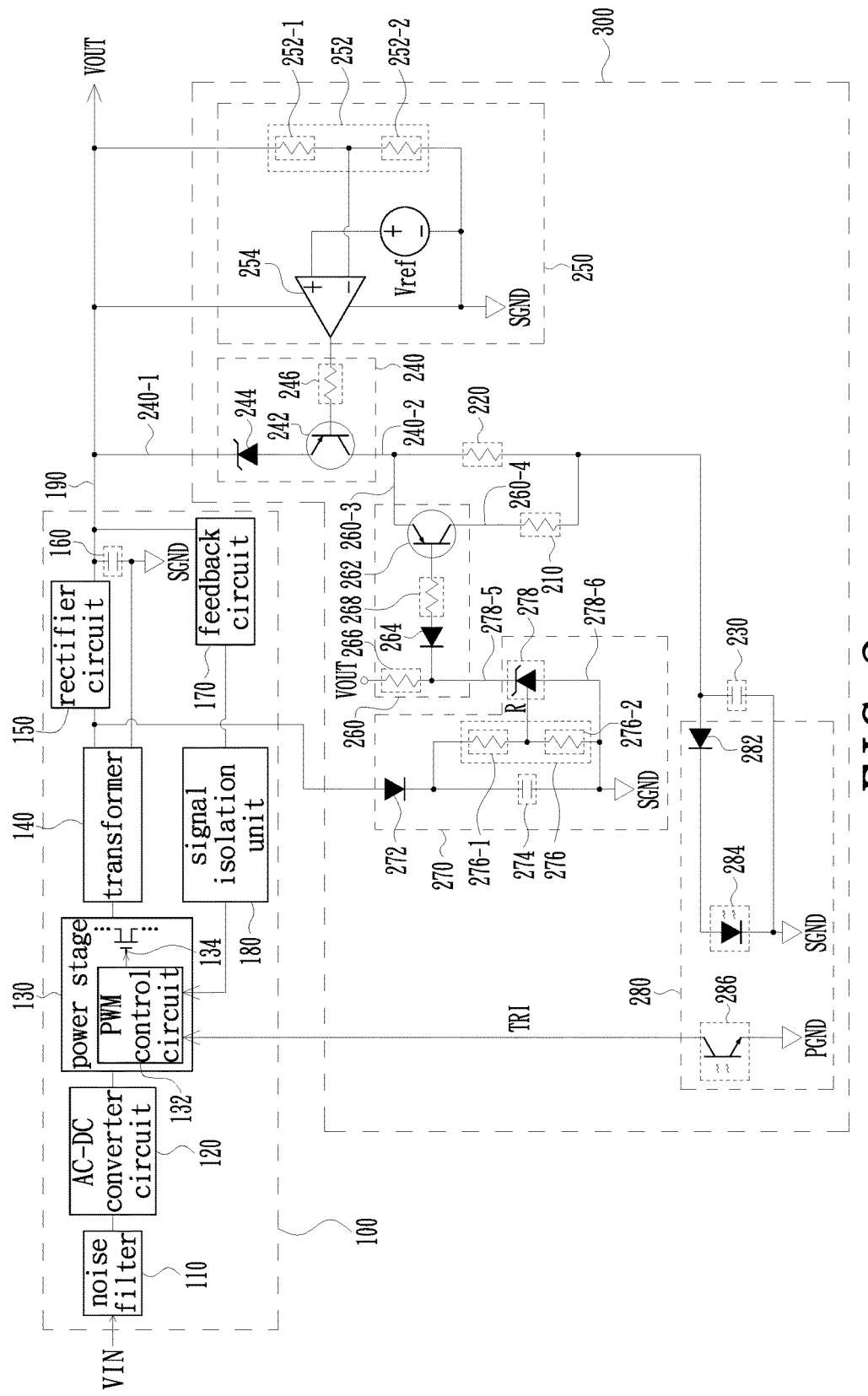
FIG. 2 is a schematic view of the coupling relationship of an overvoltage protection circuit.

In FIGS. 2 and 1, the same objects or signals are denoted by the same reference numerals. The circuit shown in FIG. 2 differs from the circuit shown in FIG. 1 in that the overvoltage protection circuit 300 in FIG. 2 additionally employs an impedance 210. The impedance 210 may be coupled between the fourth terminal 260-4 of the switching unit 260 and one end of the impedance 220, wherein the resistance of the impedance 210 is less than the resistance of the impedance 220. Preferably, the resistance of the impedance 210 is much less than the resistance of the impedance 220. The impedance 210 may be a resistor. It is understood that the impedance 210 may be coupled between the third terminal 260-3 of the switching unit 260 and one end of the impedance 220. The operation mode of the circuit shown in FIG. 2 is the same as that of the circuit shown in FIG. 1, and no redundant detail is to be given herein.

Figure 3:
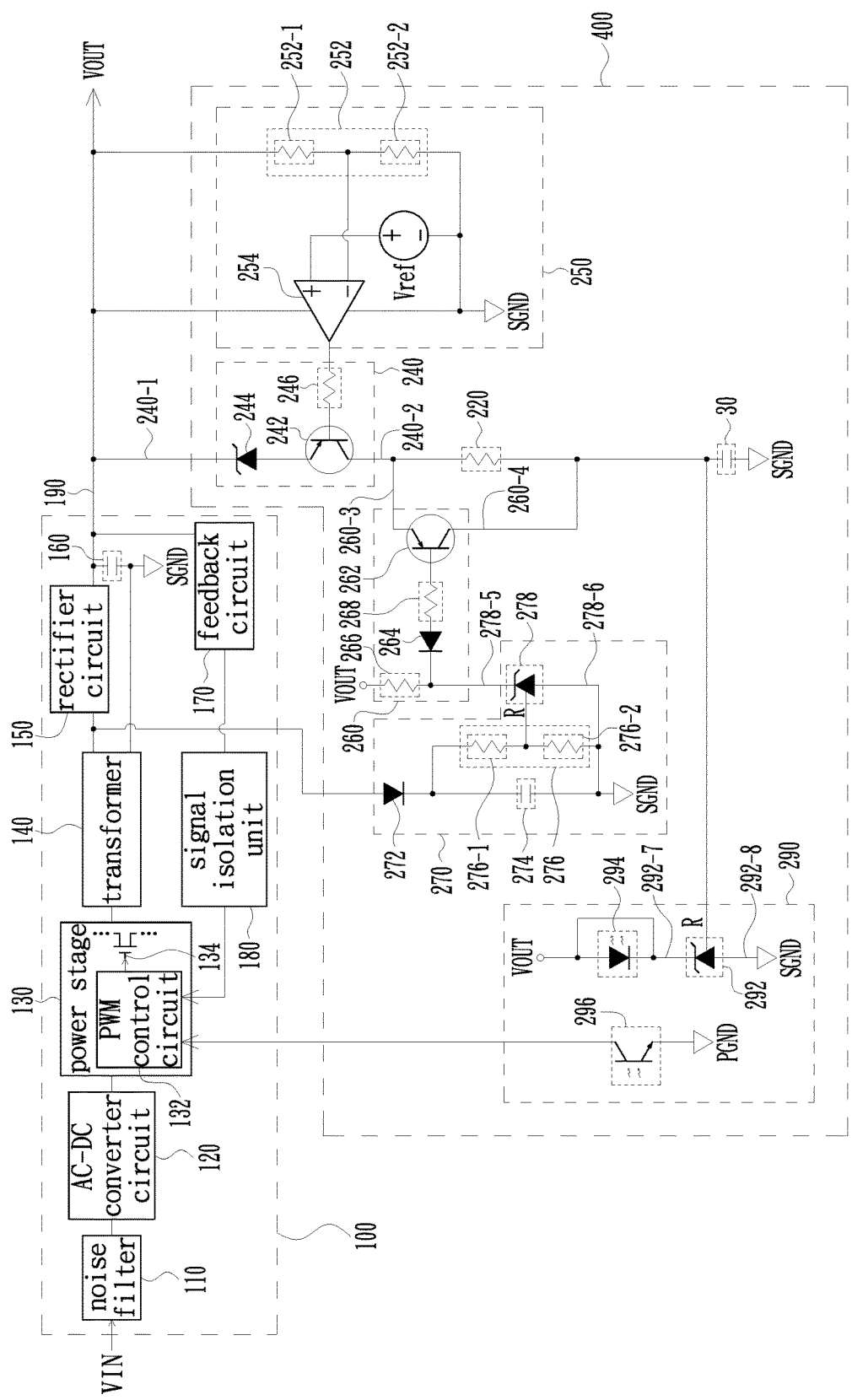
FIG. 3 is a schematic view of the coupling relationship of an overvoltage protection circuit.

In FIGS. 3 and 1, the same objects or signals are denoted by the same reference numerals. The circuit shown in FIG. 3 differs from the circuit shown in FIG. 1 in that the overvoltage protection circuit 400 in FIG. 3 employs a signal isolation unit 290. As shown in FIG. 3, the signal isolation unit 290 includes a voltage-controlled switch 292, a signal transmitting part 294 and a signal receiving part 296. The voltage-controlled switch 292 has a seventh terminal 292-7, an eighth terminal 292-8 and a reference terminal R, wherein the eighth terminal 292-8 is coupled to the reference potential SGND and the reference terminal R is coupled to the energy storage unit 230 and the impedance 220. The seventh terminal 292-7 and the eighth terminal 292-8 of the voltage-controlled switch 292 are in an on-state when the voltage at the reference terminal R of the voltage-controlled switch 292 reaches the fourth preset value. The fourth preset value and the third preset value may be the same value or may be different values. One end of the signal transmitting part 294 is coupled to the output terminal 190 and the other end thereof is coupled to the seventh terminal 292-7 of the voltage-controlled switch 292. The signal transmitting part 294 is configured to generate a coupling signal. One end of the signal receiving part 296 is coupled to the PWM control circuit 132 and the other end thereof is coupled to the reference potential PGND. The signal receiving part 296 is configured to receive the coupling signal and accordingly generates the overvoltage protection trigger signal TRI.

The signal transmitting part 294 and the signal receiving part 296 may be a transmitting part and a receiving part of a photo coupler, respectively. Since the operation mode of the circuit shown in FIG. 3 is similar to that of the circuit shown in FIG. 1, no redundant detail is to be given herein.

In summary, in the overvoltage protection circuit of the present invention, the determining result of the voltage sampling unit can be used to reflect that the overvoltage at the output terminal of the switching power supply is caused by the failure of the internal circuit of the switching power supply or by the external system. Thus, the voltage sampling unit may accordingly determine whether to control the second switching unit to provide a path parallel to the impedance, thereby further determining whether to allow the current to pass through the impedance to charge the energy storage unit or to allow the current to pass through the path to charge the energy storage unit. Since the resistance of the above-mentioned path is less than the resistance of the impedance, the energy storage unit in two different overvoltage conditions can have two different charging times, and accordingly the times for the signal isolation unit to generate the overvoltage protection trigger signal in the two different overvoltage conditions are different. With this control, the overvoltage protection circuit of the present invention can generate, when the internal circuit of the switching power supply fails, the overvoltage protection trigger signal immediately to control the switching power supply to perform overvoltage protection, and delay, when the overvoltage is caused by the external system, a period of time to generate the overvoltage protection trigger signal thereby preventing the switching power supply from immediately performing overvoltage protection and the external system from not having normal operation.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An overvoltage protection circuit adapted for a switching power supply, the overvoltage protection circuit comprising:
    a first impedance, having a first end and a second end;
    a first energy storage unit, having a first end and a second end, wherein the first end of the first energy storage unit is coupled to the first end of the first impedance and the second end of the first energy storage unit is coupled to a first reference potential;
    a first switching unit, having a first terminal and a second terminal, wherein the first terminal is coupled to an output terminal of the switching power supply and the second terminal is coupled to the second end of the first impedance;
    an overvoltage detection unit, coupled to the output terminal and the first switching unit and configured to receive an output voltage at the output terminal and determine whether the output voltage exceeds a first preset value, wherein the first terminal and the second terminal of the first switching unit are in an on-state when it is determined that the output voltage exceeds the first preset value;
    a second switching unit, having a third terminal and a fourth terminal, wherein the third terminal and the fourth terminal are coupled to the second end and the first end of the first impedance, respectively;
    a voltage sampling unit, coupled to the second switching unit and a first end of a secondary side winding of a transformer of the switching power supply and configured to detect whether a voltage outputted from the secondary side winding reaches a second preset value, wherein the third terminal and the fourth terminal of the second switching unit are in an on-state when it is determined that the voltage outputted from the secondary side winding reaches the second preset value; and
    a signal isolation unit, coupled to the first energy storage unit, the first impedance and a pulse width modulation control circuit of the switching power supply and configured to determine whether or not to generate an overvoltage protection trigger signal according to a voltage stored in the first energy storage unit, thereby using the overvoltage protection trigger signal to control the pulse width modulation control circuit to stop outputting a pulse width modulation signal.

2. The overvoltage protection circuit according to claim 1, further comprising:
    a second impedance, coupled between the third terminal and the first end of the first impedance or between the fourth terminal and the first end of the first impedance, wherein a resistance of the second impedance is less than a resistance of the first impedance.

3. The overvoltage protection circuit according to claim 1, wherein the first switching unit comprises a PNP type transistor, the PNP type transistor has an emitter, a base and a collector, the emitter is coupled to the first terminal, the collector is coupled to the second terminal, and the base is coupled to an output of the overvoltage detection unit and configured to determine whether or not the PNP type transistor is turned on according to the output of the overvoltage detection unit.

4. The overvoltage protection circuit according to claim 3, wherein the first switching unit further comprises a zener diode, the zener diode is coupled between the emitter and the first terminal, an anode of the zener diode is coupled to the emitter, and a cathode of the zener diode is coupled to the first terminal.

5. The overvoltage protection circuit according to claim 3, wherein the first switching unit further comprises a second impedance, and the second impedance is coupled between an output of the overvoltage detection unit and the base.

6. The overvoltage protection circuit according to claim 1, wherein the overvoltage detection unit comprises:
    a voltage dividing circuit, coupled between the output terminal of the switching power supply and the first reference potential and configured to generate a voltage dividing signal according to a voltage at the output terminal; and
    a comparator, having a positive input terminal for receiving a second reference potential, a negative input terminal for receiving the voltage dividing signal, and an output terminal coupled to the first switching unit.

7. The overvoltage protection circuit according to claim 1, wherein the second switching unit comprises:
    a PNP type transistor, having an emitter, a base and a collector, wherein the emitter is coupled to the third terminal and the collector is coupled to the fourth terminal;
    a diode, having an anode coupled to the base; and
    a second impedance, coupled between the output terminal of the switching power supply and a cathode of the diode.

8. The overvoltage protection circuit according to claim 1, wherein the voltage sampling unit comprises:

a diode, having an anode coupled to the first end of the secondary side winding;

a second energy storage unit, coupled between a cathode of the diode and the first reference potential;

a voltage dividing circuit, coupled between the cathode of the diode and the first reference potential and configured to generate a voltage dividing signal according to a voltage stored in the second energy storage unit; and a voltage-controlled switch, having a fifth terminal, a sixth terminal and a reference terminal, wherein the fifth terminal is coupled to the second switching unit, the sixth terminal is coupled to the first reference potential and the reference terminal receives the voltage dividing signal, wherein the fifth terminal and the sixth terminal of the voltage-controlled switch are in an on-state when a voltage at the reference terminal reaches a third preset value.

9. The overvoltage protection circuit according to claim 1, wherein the signal isolation unit comprises:

a signal transmitting part, having a first end and a second end, wherein the first end of the signal transmitting part is coupled to the first energy storage unit and the first impedance and the second end of the signal transmitting part is coupled to the first reference potential, and the signal transmitting part is configured to generate a coupling signal; and a signal receiving part, having a first end and a second end, wherein the first end of the signal receiving part is coupled to the pulse width modulation control circuit and the second end of the signal receiving part is coupled to a second reference potential, and the signal receiving part is configured to receive the coupling signal and accordingly generate the overvoltage protection trigger signal.

10. The overvoltage protection circuit according to claim 1, wherein the signal isolation unit comprises:

a voltage-controlled switch, having a fifth terminal, a sixth terminal and a reference terminal, wherein the sixth terminal is coupled to the first reference potential and the reference terminal is coupled to the first energy storage unit and the first impedance, wherein the fifth terminal and the sixth terminal of the voltage-controlled switch are in an on-state when a voltage at the reference terminal reaches a third preset value;

a signal transmitting part, having a first end and a second end, wherein the first end of the signal transmitting part is coupled to the output terminal of the switching power supply and the second end of the signal transmitting part is coupled to the fifth terminal, and the signal transmitting part is configured to generate a coupling signal; and a signal receiving part, having a first end and a second end, wherein the first end of the signal receiving part is coupled to the pulse width modulation control circuit and the second end of the signal receiving part is coupled to a second reference potential, and the signal receiving part is configured to receive the coupling signal and accordingly generate the overvoltage protection trigger signal.

\* \* \* \* \*